Aug. 21, 1951    N. TRBOJEVICH    2,565,284
BEARING
Filed Aug. 30, 1948
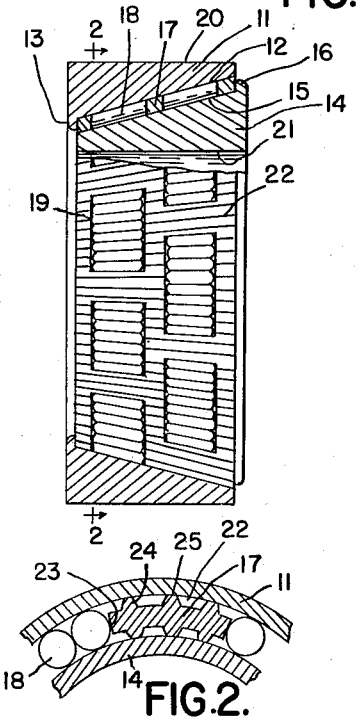
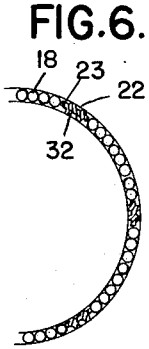
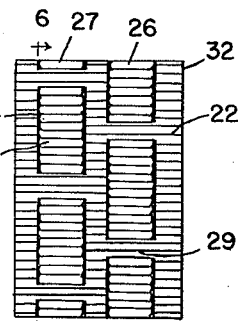
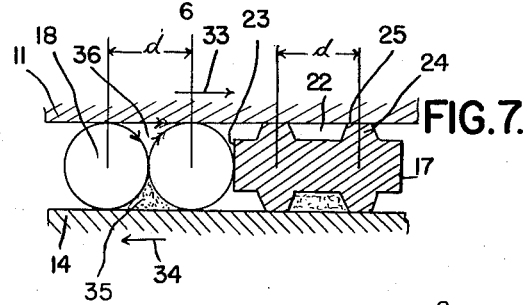
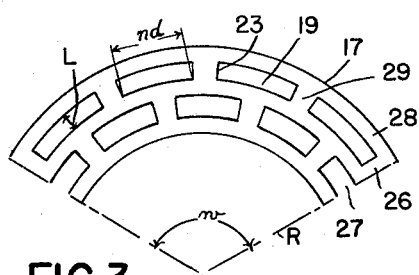
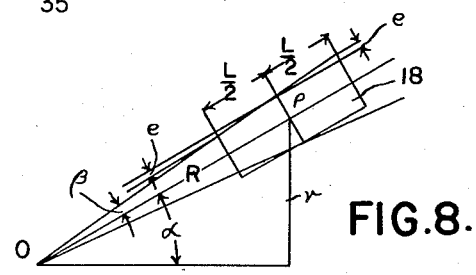
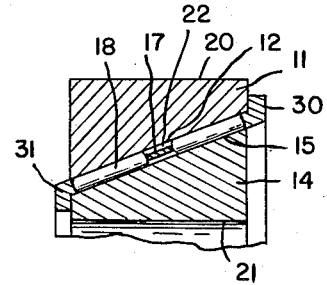
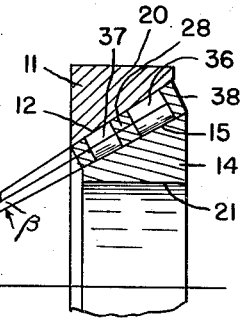
INVENTOR.
Nikola Trbojevich Patented Aug. 21, 1951

2,565,284

UNITED STATES PATENT OFFICE 2,565,284

BEARING

Nikola Trbojevich, Detroit, Mich.

Application August 30, 1948, Serial No. 46,875

10 Claims. (Cl. 308—202)

The invention relates to an improvement in bearings of the needle roller type and is applicable to both cylindrical and conical types of bearings.

The principal object of this invention is to construct a needle roller bearing of the conical type.

A further object is to construct such a bearing by using only cylindrical needles. Heretofore, needle bearings were used extensively in relatively small sizes and of the cylindrical type. To my knowledge, no one has yet succeeded in constructing such a bearing of the taper type. This is due to the fact that when a relatively large number of needle rollers contact each other all about the circumference of a cone, the manufacturing errors in individual needles are cumulative and will cause the needles to "slue" into a hypoid configuration and lock the bearing.

I conceived the idea of limiting the cumulative error within a necessary tolerance by constructing a floating bushing of the same thickness as the roller diameters and providing the said bushing with numerous apertures, usually arranged in two parallel rows and staggered. By this means the lengths of the rollers are cut in half and the overlapping disposition of the individual roller banks insures a rolling contact in any position and all around the circumference without producing any "bald" spots along the entire length of any particular generator. The said roller banks in the apertures of the bushing consist of a relatively small number of rollers, usually not over eight rollers in each bank and the bushing cooperates with the rollers in carrying the load. In other words, my invention is a combination or a compromise between a floating bushing and a roller bearing.

A further object is to utilize the same idea in the construction of cylindrical bearings of relatively large diameters, moderate capacities and needle roller type.

Another object is to construct taper bearings using tapering needles for precision work and as an alternative in lieu of the preferred cylindrical needle type.

A further object is to provide the perforated bushings with a plurality of oil grooves at their inside and outside circumferences in alignment with the corresponding rollers in order to promote a free flow of the lubricant for the rollers.

Another object is to design the novel bushings in a geometrical form which may be readily die-cast.

In the drawings:

Figure 1 is an elevation in cross-section of the improved taper bearing.

Figure 2 is a fragmentary section through the plane 2—2 of Figure 1 drawn at an enlarged scale.

Figure 3 is a plane development of the sleeve member shown in Figure 1.

Figure 4 is detail view of a modified form of the said member showing integral end flanges.

Figures 5 and 6 are two views of a sleeve member of the cylindrical type, the latter figure being a section 6—6 of Figure 5.

Figure 7 is an enlarged and partly diagrammatic development of the rolling and sleeve elements showing the formation of the oil grooves in the latter.

Figure 8 is a geometrical diagram explanatory of the theory of the device.

Figure 9 shows in elevation a modification of the bearing shown in Figure 1 in which modification taper needles are used.

As shown in Figure 1, the new taper bearing consists of an outer hollow conical race 11 having an accurately finished contact face 12 and a fringe 13 at the left side of it, an inner race 14 having a contact face 15 and a flange 16 and a relatively movable sleeve member 17 comprising two rows of cylindrical rollers 18 disposed in isolated banks of rollers filling out the corresponding quadrangular apertures 19 formed in the said sleeve.

The said outer race 11 is finished at its outer circumference to form an accurate cylinder 20 while the inner race 14 is provided with a coaxial cylindrical hole 21. The sleeve 17 is a conical shell of a uniform thickness throughout its length and in addition to the said apertures is provided with a plurality of longitudinally, disposed and rectilinear oil grooves 22, both inside and outside.

In Figure 2, the formation of the said oil grooves 22 is more clearly seen. The apertures 19 are limited by plane radial walls 23 to the extent of about one-half of the thickness of the sleeve or the diameters of the rollers 18, which is the same thing, and in the remaining fourths, equispaced trapezium shaped protuberances 24 are integrally formed, each such trapezium having a flat 25 formed at its top.

Figure 3 diagrammatically shows the sleeve 17 as developed into a plane. As it is well known from geometry, in any such development all relative distances and angles in the surface remain unchanged. The angle $w$ of the development is calculated from the relation:

$$\omega = 2\pi \sin a \tag{1}$$

in which $a$ is the cone angle of the sleeve, see also for its meaning Figure 8.

The apertures 19 are quadrilaterals having corresponding sides L and $nd$ as shown, in which L denotes the length of the roller 18, $d$ is the diameter of the said roller and $n$ is the number of rollers in any particular bank.

The apertures 19 which are preferably of an even number in each row form two parallel rows 26 and 27 respectively in the plane of rotation, while the remaining portions of the bushing consist of three circular and parallel lanes or rings 28 inter-connected by means of a plurality of shorter cross pieces 29. The object is to make the apertural area as large as practicable without, however, sacrificing thereby the strength or the rigidity of the remainder. The apertures are staggered as shown in the drawing in order to insure a rolling contact between the races at any particular angular position. A further characteristic feature resides in the formation and disposition of the longitudinal oil grooves 22.

In Figure 4 a modification of the bushing 17 is shown. In that design the bushing is provided with an upwardly pointing flange 30 at its large end and a downwardly pointing similar flange 31 at its small end. This arrangement obviates the necessity of forming flanges or lugs in the co-operating inner and outer races which may be, in this case, of a smooth conical contour throughout their lengths.

In Figures 5 and 6, two views of a cylindrical type bushing 32 are shown.

The underlying principle is similar to that employed in the design of the taper bushing 17 already described. The utility of the cylindrical bushing 32 arises from two factors; firstly, small roller diameters may be used for relatively large bearings without the danger of bunching together or slueing the individual rollers and secondly, the diameters of the rollers may be selected independently of the diameters of the races because the rollers do not form a continuous ring or circle and hence do not have to form an aliquot part of the circumference.

In Figure 7, which is substantially similar to the already described Figure 2, the subject of the oil flow is diagrammatically presented. The outer and inner races 11 and 14 respectively move with equal and opposite velocities as indicated by the arrows 33 and 34 and in contact with the rollers 18 and the bushing 17.

A curious fact in the practice of needle bearings is that the said bearings sometimes are capable of transmitting considerably heavier loads than the Hertz equations would indicate. This favorable phenomenon is explained by the presence of turbulent and triangular oil pockets 35 which are kept in constant agitation by means of the three equal velocities 36 and virtually enlarge the Hertzian contact area at that point. I conceived the idea of constructing a type of oil groove which would simulate as nearly as possible the formation of the pockets 35. For this purpose I first form the groove 22 in such a manner that its area approximates the area of the said triangular pocket 35; secondly I space the grooves with the same pitch $d$ as the diameters of the rollers and thirdly, I select the width of flat 25 at the top of the protuberances 24 with regard to the elastic modulus and the ultimate strength of the material from which the sleeve is made. This results in the somewhat curious appearance of the new bearing in that it appears to the spectator as if the entire bearing face were composed of needle rollers only although a considerable portion of the said face consists of non-rotatable elements.

In Figure 8 the diagram explains the theory of this type of bearings. When a conical roller is replaced by means of the commercially more attractive cylindrical roller as in this design, two kinds of errors are met with, namely the radial and the circumferential errors. The first said error results merely in a moderate loss of efficiency due to relative sliding. The second or circumferential error, however, results in mis-alignment of the adjacent rollers and its numerical value is equal to $e$, Figure 8:

$$e = \frac{L\beta}{2} \text{ very nearly} \tag{2}$$

$$\beta = \frac{\rho}{R} \tag{3}$$

$$R = \frac{r}{\sin \alpha} \tag{4}$$

Hence, $$e = \frac{L\rho \sin \alpha}{2r} \tag{5}$$

in which L is the length of roller as already stated, $\rho$ is the radius of roller, R is the pitch cone radius, $\alpha$ the cone angle and $r$ the radius of the bearing at the point corresponding to the midplane of the roller.

The equation 5 indicates that the "slueing" error $e$ (as it might be termed) may be made as small as to be negligible when the length L and diameter of the roller, as well as the cone angle are selected relatively small. Under such conditions, the angle $\beta$ will be about $0° 30'$ or less. In such a case by the virtue of the compartmental arrangement of the rollers peculiar to this invention, cylindrical rollers may be used for the simplicity's and economy's sake. However, it is of interest to note that this type of taper bearing may be modified to be theoretically correct; i. e. to possess no slueing error whatever.

In Figure 9 a modification of this kind is shown. The rollers 36 and 37 corresponding to the roller rows 26 and 27, see Figure 3, as well as the bushing 38 are made of a tapering form in such a manner that their respective cone generators all pass through the point 0, the apex of the pitch cone of the bearing. In all other respects, the bearing is similar to the one shown in Figures 1 and 2 and will not be further described.

What I claim as my invention is:

1. A bearing comprising an inner and an outer member having contacting surfaces in the form of two coaxial cones, a relatively rotatable bushing in the form of a conical shell contacting both said members, a plurality of quadrangular apertures in the said bushing and a plurality of mutually contacting rollers in each said aperture, in which adjacent diameters of the said rollers are equal to the momentary thickness of the said bushing at all points.

2. A bearing comprising an inner and an outer member having respective contact surfaces in the form of two coaxial cones, a relatively rotatable bushing having the form of a perforated conical shell between the said two members, a plurality of quadrangular apertures disposed in two parallel and relatively overlapping rows in the said bushing and a plurality of mutually contacting rollers in each said aperture, the arrangement being such that in any axial plane of the said bearing there are at least two rollers to be found in juxtaposit alignment.

3. A bearing comprising an inner and an outer member and a relatively rotatable bushing in between contacting the said two members, in which the said bushing is provided with a plurality of apertures disposed in a plurality of parallel and overlapping rows and filled out with a plurality of mutually contacting rollers having the same respective diameters as the momentary thickness of the said bushing and in which the said rollers are contained at all sides by the walls of the said apertures whereby they are enabled to rotate but not translate with respect to the said bushing.

4. A bearing comprising an inner and an outer member having respective contacting surfaces in the form of two parallel cones, a relatively rotatable bushing of a constant thickness throughout its length contacting the said members, a plurality of quadrangular apertures in the said bushing and a plurality of mutually contacting cylindrical rollers in each said aperture, in which the diameters of the said rollers are substantially equal to the said thickness and contact the opposite walls of the said apertures with their respective ends whereby they are enabled to rotate but not relatively translate with respect to the said bushing.

5. A bearing comprising two bearing surfaces having the form of two coaxial, parallel and relatively rotatable cones, a perforated conical shell between the said surfaces and relatively rotatable with respect to each, a plurality of mutually overlapping apertures in the said shell, a plurality of mutually contacting cylindrical rollers relatively tightly packed in the said apertures and a plurality of rectilinear oil grooves longitudinally extending at the outer and inner circumferences of the said shell and aligned with the said rollers.

6. A bearing of the kind described in claim 5 in which the thickness of the shell as measured between two adjacent oil grooves is equal to the diameter of the rollers.

7. A bearing of the kind described in claim 5 in which the maximum number of rollers in any aperture does not exceed eight.

8. A bearing of the kind described in claim 5 in which the apertures are disposed in two parallel rows and the number of apertures is the same in both rows and even.

9. A bearing of the kind described in claim 5 in which the apertures are aligned in two parallel rows and relatively staggered and in which the shell is provided with three integrally formed and continuous rings, one at each end of the said shell and one ring between the said two rows of apertures.

10. A bearing comprising an inner and an outer member coaxially and relatively rotatably aligned, a perforated shell having inner and outer oil grooves and intervening bearing areas capable of simultaneously contacting both said members with a surface contact and a plurality of cylindrical, relatively short rollers tightly packed in the corresponding apertures formed in the said shell in groups not exceeding eight rollers in each aperture, in which the said apertures are so staggered that any axial plane drawn through the axis of the bearing intersects at least two rollers and in which the said rollers simultaneously contact each other, the walls of the said apertures and the said members.

NIKOLA TRBOJEVICH.

REFERENCES CITED

The following references are of record in the file of this patent:

UNITED STATES PATENTS

| Number | Name | Date |
|---|---|---|
| 604,572 | Tellefsen | May 24, 1898 |
| 1,565,662 | Lott | Dec. 15, 1925 |
| 1,617,700 | Blake | Feb. 15, 1927 |
| 2,062,041 | Robinson | Nov. 24, 1936 |
| 2,106,127 | Slusser | Jan. 18, 1938 |